US012619881B2

(12) United States Patent
Lioutas et al.

(10) Patent No.: US 12,619,881 B2
(45) Date of Patent: May 5, 2026

(54) METHOD AND SYSTEM FOR TRAINING A NEURAL NETWORK MODEL USING ADVERSARIAL LEARNING AND KNOWLEDGE DISTILLATION

(71) Applicants:Vasileios Lioutas, Ottawa (CA); Ahmad Rashid, Montreal (CA); Mehdi Rezagholizadeh, Montreal (CA)

(72) Inventors: Vasileios Lioutas, Ottawa (CA); Ahmad Rashid, Montreal (CA); Mehdi Rezagholizadeh, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 580 days.

(21) Appl. No.: 18/119,211

(22) Filed: Mar. 8, 2023

(65) Prior Publication Data

US 2023/0222353 A1     Jul. 13, 2023

Related U.S. Application Data

(63) Continuation of application No. PCT/CA2021/051249, filed on Sep. 9, 2021.

(60) Provisional application No. 63/076,374, filed on Sep. 9, 2020.

(51) Int. Cl.
*G06N 20/00*          (2019.01)
*G06N 3/045*          (2023.01)
*G06N 3/094*          (2023.01)
(52) U.S. Cl.
CPC ............. *G06N 3/094* (2023.01); *G06N 3/045* (2023.01)

(58) Field of Classification Search
None
See application file for complete search history.

(56) References Cited

U.S. PATENT DOCUMENTS

| | | |
|---|---|---|
| 2019/0244103 A1 | 8/2019 | Wang et al. |
| 2019/0325269 A1 | 10/2019 | Bagherinezhad et al. |

OTHER PUBLICATIONS

Brown, T. B., Mann, B., Ryder, N., Subbiah, M., Kaplan, J., Dhariwal, P. & Agarwal, S. (2020). Language models are few-shot learners. arXiv preprint arXiv:2005.14165.

Li, Z., Wallace, E., Shen, S., Lin, K., Keutzer, K., Klein, D., & Gonzalez, J. E. (2020). Train large, then compress: Rethinking model size for efficient training and inference of transformers. arXiv preprint arXiv:2002.11794.

Hinton, G., Vinyals, O., & Dean, J. (2015). Distilling the knowledge in a neural network. arXiv preprint arXiv:1503.02531.

(Continued)

*Primary Examiner* — David R Vincent

(57) ABSTRACT

Method and system of training a student neural network using adversarial learning and knowledge distillation, including: training a generator to generate adversarial data samples for respective training data samples by masking parts of the training data samples with an objective of maximizing a divergence between output predictions generated by the student neural network and a teacher neural network model for the adversarial data samples; and training the student neural network based on objectives of (i) minimizing a divergence between output predictions generated by the student neural network and the teacher neural network model for the adversarial data samples, and (ii) minimizing a divergence between output predictions generated by the student neural network and the teacher neural network model for the training data samples.

20 Claims, 6 Drawing Sheets

(56)      References Cited

OTHER PUBLICATIONS

Jiao, X., Yin, Y., Shang, L., Jiang, X., Chen, X., Li, L., & Liu, Q. (2019). Tinybert: Distilling bert for natural language understanding. arXiv preprint arXiv:1909.10351.

Sun, Z., Yu, H., Song, X., Liu, R., Yang, Y., & Zhou, D. (2020). Mobilebert: a compact task-agnostic bert for resource-limited devices. arXiv preprint arXiv:2004.02984.

Wang, W., Wei, F., Dong, L., Bao, H., Yang, N., & Zhou, M. (2020). Minilm: Deep self-attention distillation for task-agnostic compression of pre-trained transformers. arXiv preprint arXiv:2002.10957.

Szegedy, C., Zaremba, W., Sutskever, I., Bruna, J., Erhan, D., Goodfellow, I., & Fergus, R. (2013). Intriguing properties of neural networks. arXiv preprint arXiv:1312.6199.

Cheng, Y., Jiang, L., & Macherey, W. (2019). Robust neural machine translation with doubly adversarial inputs. arXiv preprint arXiv:1906.02443.

Zhu, C., Cheng, Y., Gan, Z., Sun, S., Goldstein, T., & Liu, J. (2019). Freelb: Enhanced adversarial training for language understanding. arXiv preprint arXiv:1909.11764.

Haidar et al., "TextKD-GAN: Text Generation using Knowledge Distillation and Generative Adversarial Networks". arXiv, Apr. 23, 2019, (Apr. 23, 2019), pp. 1-12, (online) (retrieved on Nov. 9, 2021 (Sep. 11, 2021). Retrieved from the Internet: https://arxiv.org/pdf/1905.01976.pdf *whole document*.

Kusner et al., "GANS for Sequences of Discrete Elements with the Gumbel-softmax Distribution". arXiv, Nov. 12, 2016 (Nov. 12, 2016), pp. 1-6, (online) (retrieved on Nov. 9, 2021 (Nov. 9, 2021). Retrieved from the Internet: https://arxiv.org.pdf/1611.04051.pdf.

A: Jang et al., "Categorical Reparametrization with Gumbel-Softmax". arXiv, Aug. 5, 2017 (Aug. 5, 2017), pp. 1-13, (online) (retrieved on Nov. 9, 2021 (Nov. 9, 2021). Retrieved from the internet: https://arxiv.org/pdf/1611.01144.pdf%20http://arxiv.orgabs/1611.01144.pdf *whole document*.

Fedus et al., "MaskGan: Better Text Generation via filling in the __". arXiv, Mar. 1, 2018 (Mar. 1, 2018), pp. 1-17, (online) (retrieved on Nov. 9, 2021 (Nov. 9, 2021). Retrieved from the internet <https://arxiv.org/pdf/1801.07736.pdf abstract: section 1 3rd paragraph, section 3.1, section 3.2, section 3.4, 2nd paragraph.

Micaelli et al., "Zero-shot Knowledge Transfer via Adversarial Belief Matching", arXiv: 1905.09768v4 (cs.LG) Nov. 25, 2019.

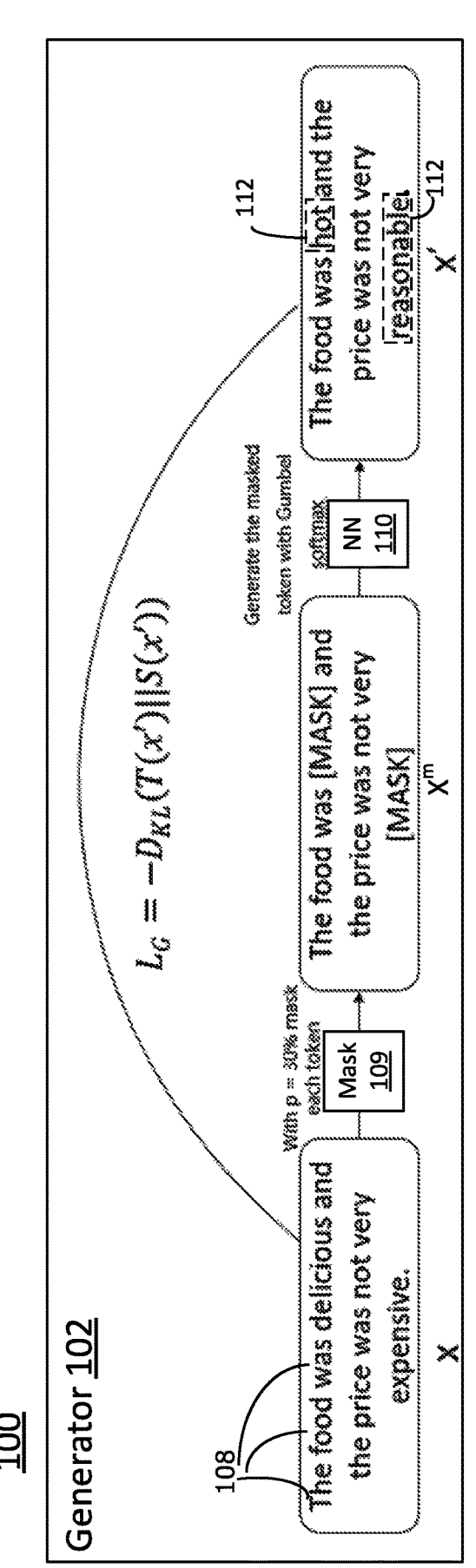
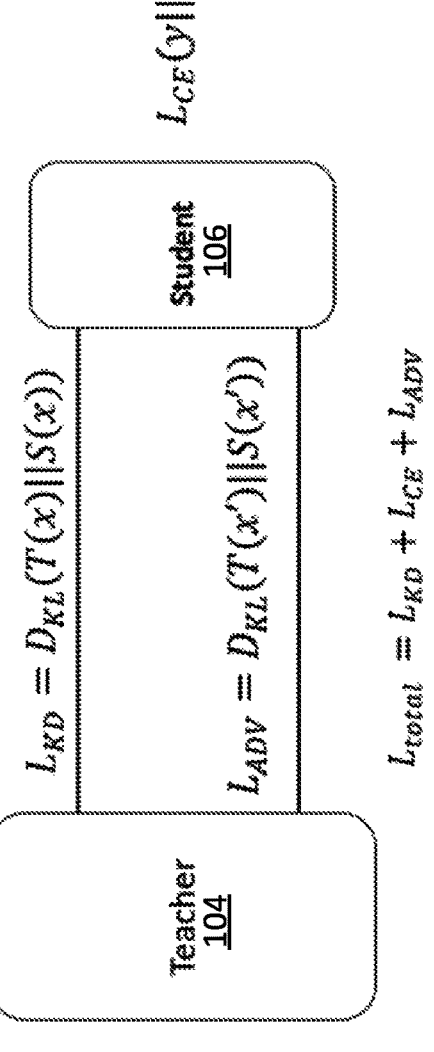
FIG. 1

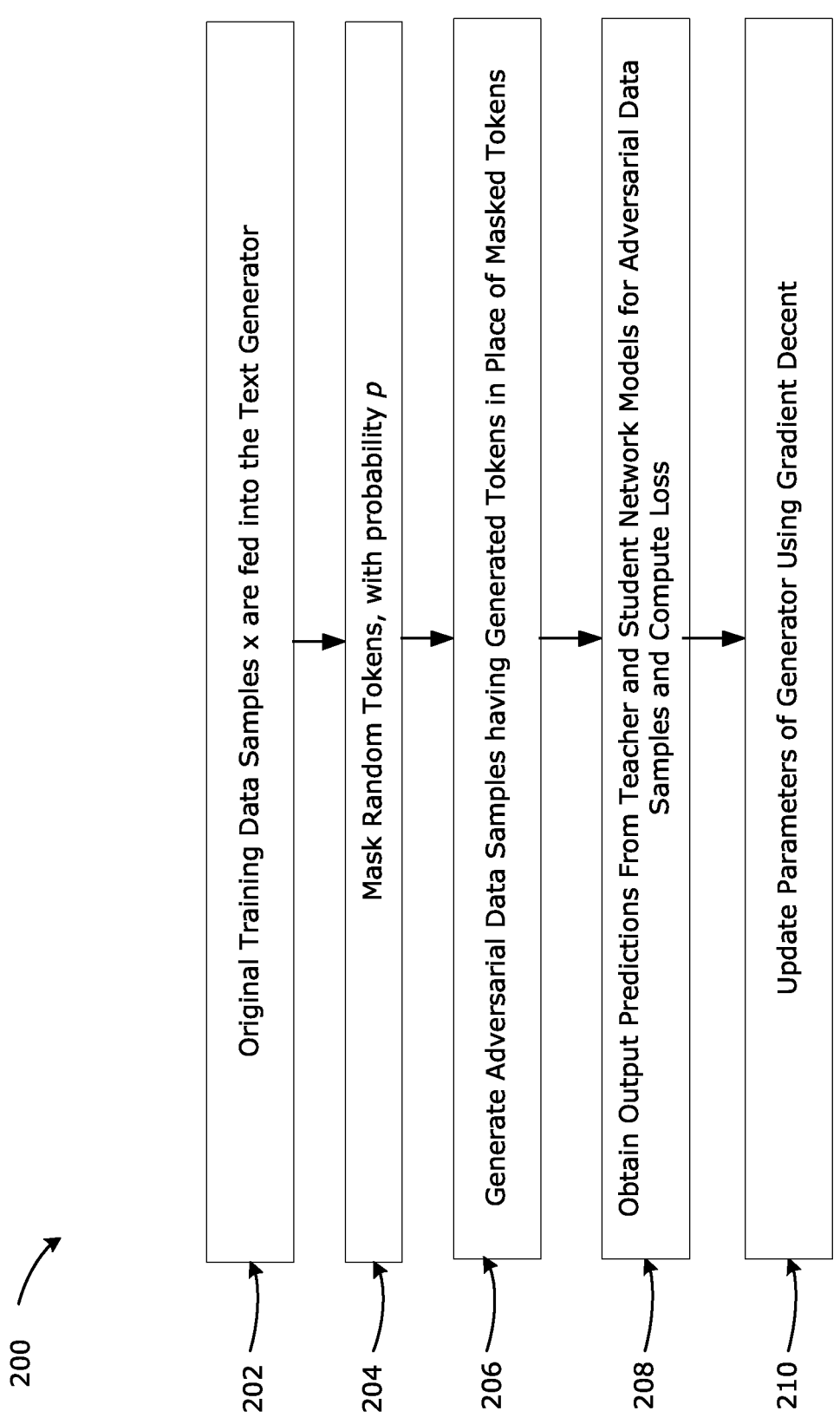

202 — Original Training Data Samples x are fed into the Text Generator

204 — Mask Random Tokens, with probability $p$

206 — Generate Adversarial Data Samples having Generated Tokens in Place of Masked Tokens 208 — Obtain Output Predictions From Teacher and Student Network Models for Adversarial Data Samples and Compute Loss 210 — Update Parameters of Generator Using Gradient Decent

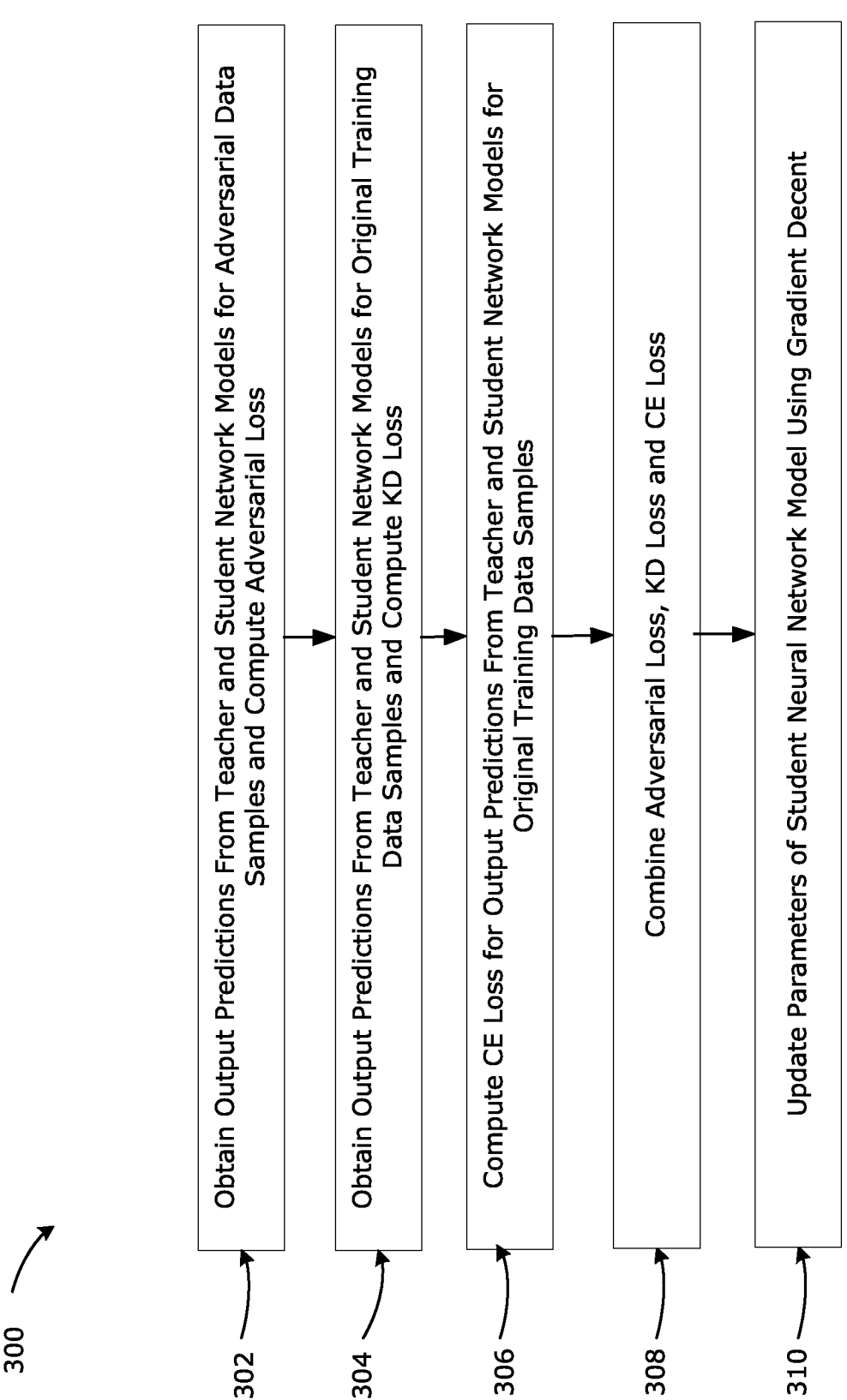

302 — Obtain Output Predictions From Teacher and Student Network Models for Adversarial Data Samples and Compute Adversarial Loss 304 — Obtain Output Predictions From Teacher and Student Network Models for Original Training Data Samples and Compute KD Loss 306 — Compute CE Loss for Output Predictions From Teacher and Student Network Models for Original Training Data Samples 308 — Combine Adversarial Loss, KD Loss and CE Loss 310 — Update Parameters of Student Neural Network Model Using Gradient Decent

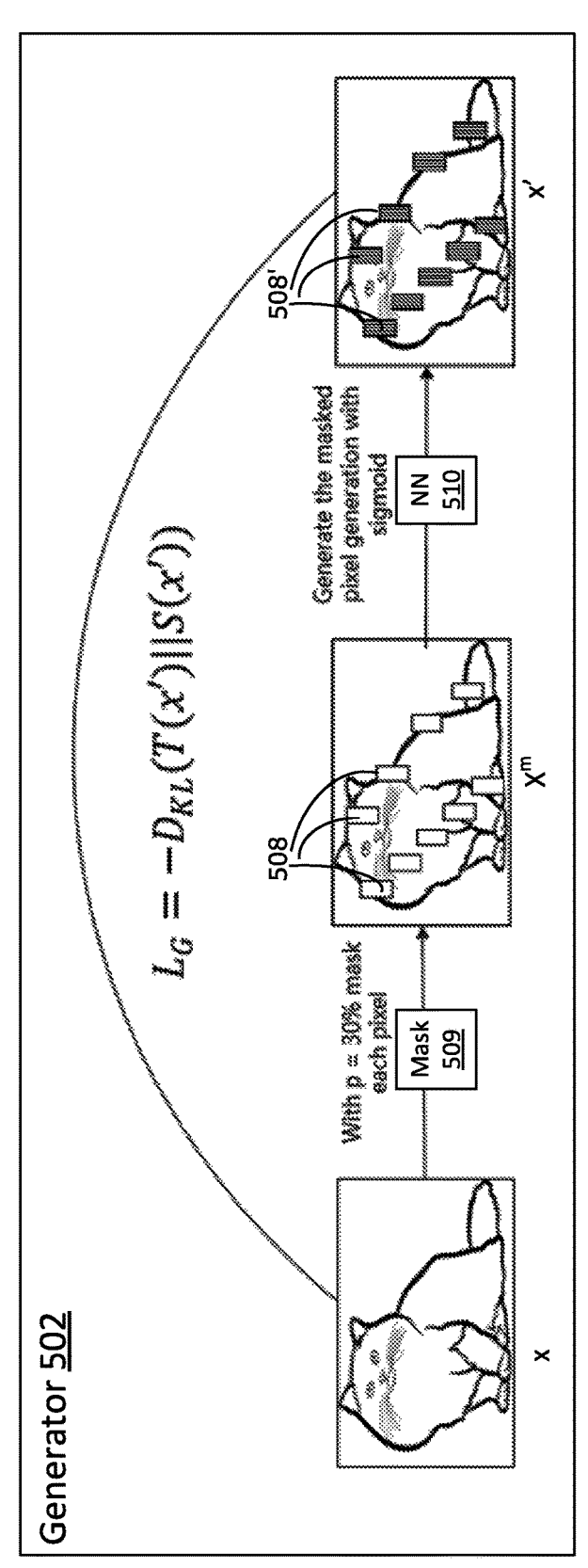
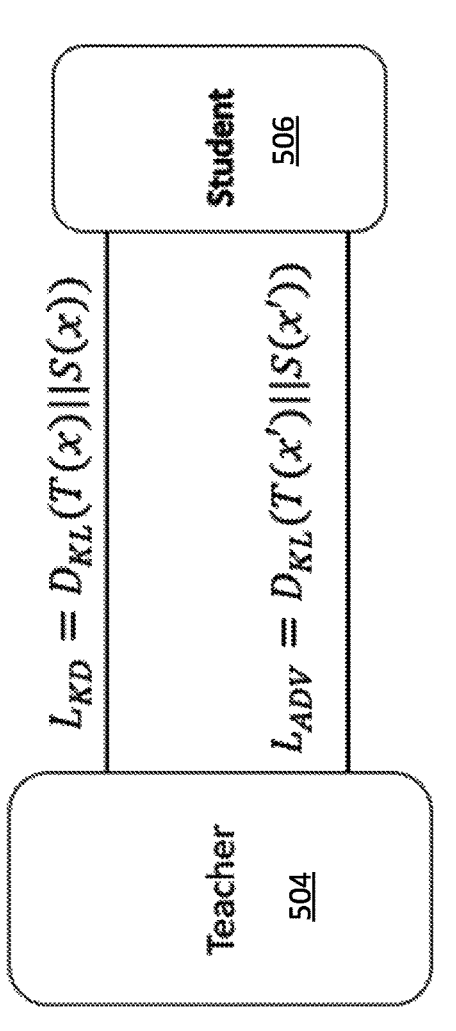
FIG. 5

METHOD AND SYSTEM FOR TRAINING A NEURAL NETWORK MODEL USING ADVERSARIAL LEARNING AND KNOWLEDGE DISTILLATION

RELATED APPLICATION DATA

The present application is a continuation of International Patent Application No. PCT/CA2021/051249, filed Sep. 9, 2021 the content of which is incorporated herein by reference, which claims priority to, and the benefit of, provisional U.S. patent application No. 63/076,374, filed Sep. 9, 2020, the content of which is incorporated herein by reference.

FIELD

The present application relates to methods and systems for training machine learning models, and, in particular, methods and systems for training a neural network model using adversarial learning and knowledge distillation.

BACKGROUND

Deep learning based algorithms are machine learning methods used for many machine learning applications in natural language processing (NLP) and computer vision (CV) fields. Deep learning consists of composing layers of non-linear parametric functions or "neurons" together and training the parameters or "weights", typically using gradient-based optimization algorithms, to minimize a loss function. One key reason of the success of these methods is the ability to improve performance with an increase in parameters and data. In NLP this has led to deep learning architectures with billions of parameters (Brown et. al 2020). Research has shown that large architectures or "models" are easier to optimize as well. Model compression is thus imperative for any practical application such as deploying a trained machine learning model on a phone for a personal assistant.

Knowledge distillation (KD) is a neural network compression technique whereby the generalizations of a complex neural network model are transferred to a less complex neural network model that is able to make comparable inferences (i.e. predictions) as the complex model at less computing resource cost and time. Here, complex neural network model refers to a neural network model with a relatively high number of computing resources such as GPU/CPU power and computer memory space and/or those neural network models including a relatively high number of hidden layers. The complex neural network model, for the purposes of KD, is sometimes referred to as a teacher neural network model (T) or a teacher for short. A typical drawback of the teacher is that it may require significant computing resources that may not be available in consumer electronic devices, such as mobile communication devices or edge computing devices. Furthermore, the teacher neural network model typically requires a significant amount of time to infer (i.e. predict) a particular output for an input due to the complexity of the teacher neural network model itself, and hence the teacher neural network model may not be suitable for deployment to a consumer computing device for use therein. Thus, KD techniques are applied to extract, or distill the learned parameters, or knowledge, of a teacher neural network model and impart such knowledge to a less sophisticated neural network model with faster inference time and reduced computing resource and memory space cost that may with less effort on consumer computing devices, such as edge devices. The less complex neural network model is often referred to as the student neural network model (S) or a student for short. The KD techniques involve training the student using not only the labeled training data samples of the training dataset but also using the outputs generated by the teacher neural network model, known as logits.

An example of a KD loss function used for training a student neural network model is as follows:

$$L_{KD}=\alpha * H(y,\sigma(zs;T=1))+(1-\alpha) * H(\sigma(zt;T=\tau),\sigma(zs;T=\tau)) \tag{1}$$

where H is the cross-entropy loss function (other loss functions may also be used), $\sigma$ is the softmax function, parameter T is a temperature parameter, $\alpha$ is a hyper-paramter that controls the amount of contribution from the cross entropy loss function and KD loss, and zt and zs are the logits (i.e. the output of the neural network before the last softmax layer) of the teacher neural network model (T) and student neural network model (S) respectively.

KD techniques are widely used because they are agnostic to the architectures of the neural networks of the teacher and the student neural network models and require only access to the outputs generated by the teacher neural network model in order to train the student neural network model to effectively imitate the behavior of the teacher neural network model. Still, for many applications there is a significant gap between the performance of the teacher neural network model and the performance of the student neural network model and various KD techniques have been proposed to reduce this gap. For example, in the NLP field, KD techniques have been proposed whereby knowledge transfer can be effected by learning parameters of the teacher and student neural network models in stages and freezing the parameters, or by defining intermediate neural networks which learns from the teacher neural network model and teaches the student neural network model.

Known KD techniques present a number of challenges. First, many known KD techniques have been demonstrated on a specific neural network model architecture, such as a transformer, in the scenario where the teacher and student neural network models use the same architecture. Further, the training process used for many known KD techniques typically applies arbitrary design choices which work for one task but are difficult to generalize to other tasks. Additionally, training of the teacher neural network model can be computationally expensive (i.e. requires significant processing and memory resources that consume power). Moreover, many known KD techniques require access to the parameters (e.g., weights) of the teacher neural network model as well as the output of the teacher neural network model. Finally, for many known KD techniques, the difference between the accuracy of the teacher neural network model and the accuracy of the student neural model, can be large.

Improvements in methods of training a neural network model using knowledge distillation to reduce a difference between the accuracy of the teacher model and the accuracy of the student model are desirable.

SUMMARY

According to example aspects, the present disclosure describes a method of training a student neural network model using adversarial learning and knowledge distillation. The method includes training a generator to generate a respective adversarial data sample for each of a plurality of input data samples by replacing selected parts of the input data samples, the training of the generator being based on an objective of maximizing divergence between output predictions generated by the student neural network and a teacher neural network model for the adversarial data samples. The method further includes training the student neural network model based on objectives of: (i) minimizing divergence between output predictions generated by the student neural network model and the teacher neural network model for the adversarial data samples generated by the generator, and (ii) minimizing divergence between output predictions generated by the student neural network model and the teacher neural network model for the input data samples.

In at least some applications, the introduction of perturbed input data samples that are specifically generated to cause a divergence of teacher neural network and student neural network model output predictions can improve the training and accuracy of the student neural network model.

In some example aspects, training the generator comprises: for each of the input data samples, randomly selecting and masking the selected parts of the input data sample and generating, using a generator neural network model, the respective adversarial data sample with replacement data for the selected parts of the masked input data; obtaining output predictions for the respective adversarial data samples from the teacher neural network model and the student teacher neural network model; computing a generator loss using a generator loss function that is minimized when divergence between the output predictions generated by the student neural network and a teacher neural network model for the respective adversarial data samples is maximized; and updating parameters of the generator neural network model using gradient decent based on the computed loss.

In some examples of one or more of the preceding aspects, randomly selecting the selected parts of the input data sample is performed by randomly determining, based on a defined probability, for each part of a input data sample, if the part is to be selected as one of the selected parts.

In some examples of one or more of the preceding aspects, generating the replacement data for the selected parts comprises sampling a Gumbel softmax distribution of logits generated by the generator neural network model.

In some examples of one or more of the preceding aspects, the student neural network model is trained to perform a natural language processing task and each of the input data samples is a text data sample comprising a set of tokens that each correspond to a discrete text element of the text data sample, wherein the selected parts of the input data samples correspond to individual tokens.

In some examples of one or more of the preceding aspects, the student neural network model is trained to perform an image processing and each of the input data samples is an image data sample comprising a set of pixels, wherein the selected parts of the input data samples correspond to pixels.

In some examples of one or more of the preceding aspects, divergence between the output predictions generated by the student neural network and a teacher neural network model for the respective adversarial data samples corresponds to a Kullback-Leibler (KL) divergence.

In some examples of one or more of the preceding aspects, the divergence between the output predictions generated by the student neural network and a teacher neural network model for the input data samples corresponds to a Kullback-Leibler (KL) divergence.

In some examples of one or more of the preceding aspects, training the student neural network model is also based on an objective of minimizing divergence between output predictions generated by the student neural network for the input data samples and ground truth labels for the input data samples.

In some examples of one or more of the preceding aspects, divergence between the output predictions generated by the student neural network and the ground truth labels for the input data samples corresponds to a Cross-Entropy loss.

According to a further example aspect, a system for training a student neural network model is disclosed. The system comprises one or more processers and a non-transitory storage medium storing software instructions that, when executed by the one or more processors, configure the system to perform the method of one or more of the preceding aspects.

According to a further example aspect, a non-transitory computer readable medium storing software instructions is disclosed. The software instructions, when executed by the one or more processors, configure the one or more processors to perform the method of one or more of the preceding aspects.

According to further example aspects, the present disclosure provides methods and systems for training a student neural network using adversarial learning and knowledge distillation. A generator is trained to generate adversarial data samples for respective input data samples by masking parts of the input data samples with an objective of maximizing a divergence between output predictions generated by the student neural network and a teacher neural network model for the adversarial data samples. The student neural network is trained based on objectives of (i) minimizing a divergence between output predictions generated by the student neural network and the teacher neural network model for the adversarial data samples, and (ii) minimizing a divergence between output predictions generated by the student neural network and the teacher neural network model for the input data samples.

In some examples, training the student neural network is also based on an objective of minimizing a divergence between output predictions generated by the student neural network for the input data samples and ground truth labels for the training data samples.

BRIEF DESCRIPTION OF THE DRAWINGS

Reference will now be made, by way of example, to the accompanying drawings which show example embodiments of the present application, and in which:

FIG. 1 illustrates a schematic block diagram of a system for training a neural network model for a NLP task using adversarial learning and knowledge distillation in accordance with an embodiment of the present disclosure;

FIG. 2 is a flow diagram of a process for training a text generator of the system of FIG. 1;

FIG. 3 is a flow diagram of a process for training a student neural network model of the system of FIG. 1;

FIG. 5 illustrates a schematic block diagram of a system for training a neural network model for an image processing task using adversarial learning and knowledge distillation in accordance with an embodiment of the present disclosure.

DESCRIPTION OF THE INVENTION

Figure 4:
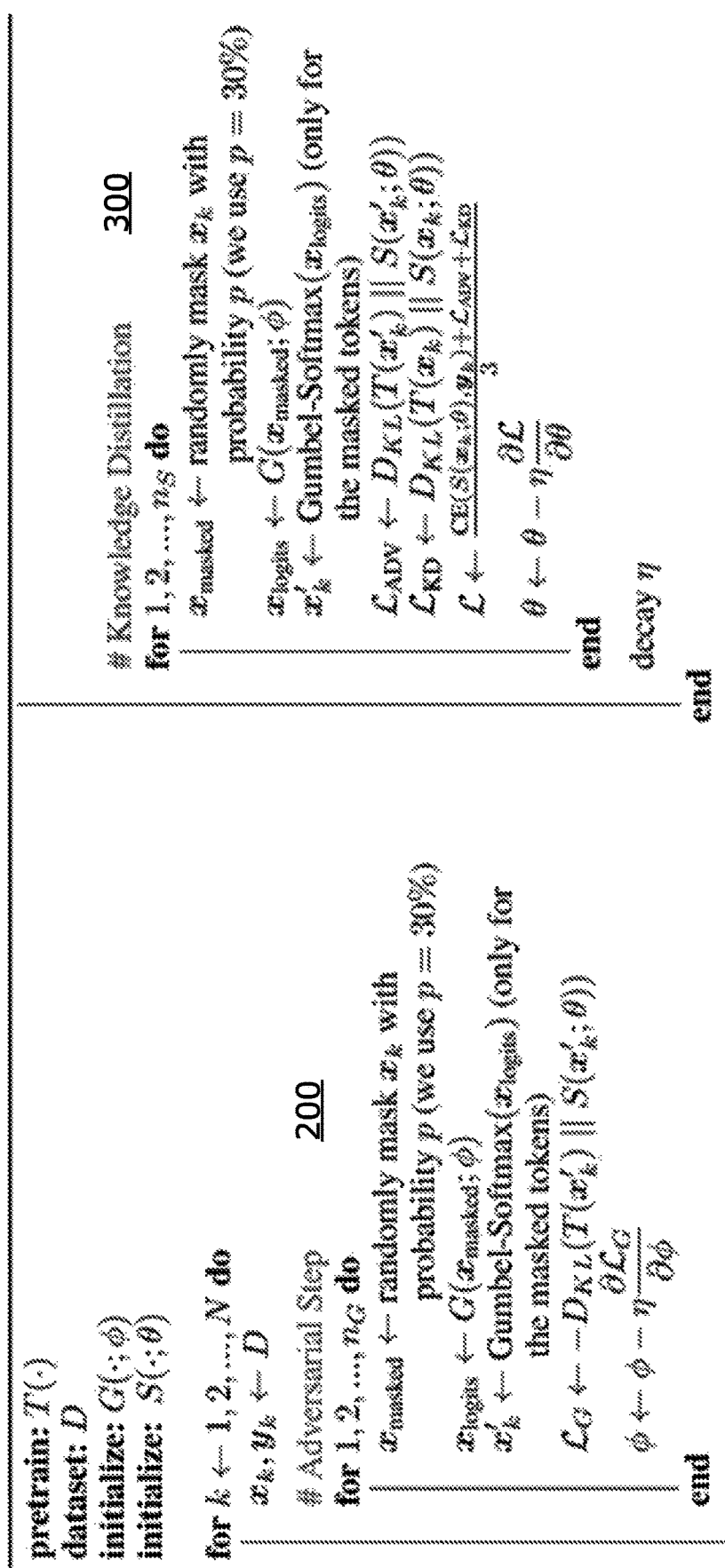
FIG. 4 illustrates pseudo code of a method of training a neural network model (i.e. a student neural network model) using adversarial learning and knowledge distillation in accordance with an embodiment of the present disclosure.

The present disclosure relates to a method and system for training a neural network model using adversarial learning and knowledge distillation in order to reduce a difference between the accuracy of a teacher neural network model and the accuracy of a student neural network model.

According to aspects of the disclosure, a set of adversarial data samples are generated by perturbing a set of original training data samples. This can be performed by masking parts of the original training data samples and generating respective adversarial data samples in which the masked parts are replaced with generated content. A generator is trained to generate the adversarial data samples so that the output predictions of the teacher and student neural network models diverge for the adversarial data samples. The student neural network model is then trained using KD with both the original training data samples and the adversarial data samples. The method and system of the present disclosure can improve knowledge distillation between the teacher neural network model and the student neural network for both discrete data processing tasks, such as embedding vectors representative of text, and continuous data processing tasks, such as image data.

FIG. 1 illustrates a schematic block diagram of a machine learning system 100 (hereinafter referred to as system 100) for training a neural network model for a NLP task using adversarial learning and knowledge distillation in accordance with an embodiment of the present disclosure. The system 100 includes a text generator 102 (illustrated as generator), a teacher neural network model 104 (illustrated as teacher), and a student neural network model 106 (illustrated as student). The teacher neural network model 104 is a large trained neural network model. In an NLP example, the teacher neural network model 104 has been trained to perform an NLP task to generate an output prediction for an input text data sample (x), which in example embodiments can be a vector of tokens, with each token representing a discrete element within the input text data sample (x). For example, in various processing tasks, the discrete elements that are used as tokens can be words, terms, sentences, symbols, or some other meaningful elements. In this regard, each token can be considered a discrete part of input text data sample (x). Aspects of the present disclosure can be applied to a variety a different NLP tasks, including for example NLP tasks that support chatbot applications, search engine autocomplete applications, voice assistant applications, language translator applications, sentiment analysis applications, grammar check applications, and email classification and filtering applications, among other things. In all such cases, the teacher neural network model 104 has been trained to map an input text data sample (x) to an output prediction (ŷ) that is appropriate for the application. For example, in the case of sentiment analysis, an input text data sample (x) could be mapped to an output prediction (ŷ) that is selected from the candidate prediction set of "Good", "Bad", and "Neutral".

The student neural network model 106 is smaller than the teacher neural network model 104 (i.e., has fewer and/or compressed parameters, and/or fewer hidden layers, and/or requires fewer computations to generate a prediction). Student neural network model 106 is to be trained to imitate the behavior of the teacher neural network model for an NLP task.

The text generator 102 is configured to receive input text data samples (x) of an original training dataset (X) in which each input text data sample (x) includes a vector of discrete parts, namely tokens. The text generator 102 is configured to generate adversarial text data samples (x') by randomly replacing tokens in the input text data samples (x) with generated tokens to provide an augmented training dataset (X U X') that is used for KD training of the student neural network model 106.

The system 100 performs a method of the present disclosure that includes two stages. In a first stage, the text generator 102 is trained and in the second stage the student neural network model 106 is trained using knowledge distilled from the teacher neural network model 104. The first stage of the method of the present disclosure will now be described with reference to FIG. 1 and the flowchart of FIG. 2, which illustrates a process 200 for training the text generator 102 to generate adversarial data samples x' (also referred to as adversarial examples).

As indicated in block 202, training text data samples x from original training dataset X are provided as input text data samples x to text generator 102. As illustrated in FIG. 1, each input text data sample x comprises a vector of tokens 108. In the illustrated example, each token 108 corresponds to an individual word. As indicated in block 204, text generator 102 then randomly selects tokens from the vector of tokens 108 included in each text data sample x for masking. In one example, text generator 102 includes masking operation 109 that is configured to randomly determine for each token, based on a defined probability p (for example 30%), if the token should be masked or not. By way of example, as shown in FIG. 1 in the case of the input text data sample "The food was delicious and the price was not very expensive", the mask operation 109 of text generator 102 randomly masks the tokens "delicious" and "expensive", and outputs a masked text data sample $x^m$.

As indicated in block 206, text generator 102 is configured to generate replacement tokens to replace the masked tokens included in masked text data samples $x^m$ and thereby generate respective adversarial text data samples x'. In this regard, the text generator 102 includes a generator neural network model 110 that is configured to receive a masked text data sample $x^m$ as input and generate replacement tokens 112 for the masked tokens included in the masked text data sample $x^m$. In example embodiments, the text generator 102 generates the replacement tokens 112 for the masked tokens by sampling a Gumbel softmax distribution of the logits generated by generator neural network model 110. This can enable end-to-end differentiation to support backpropagation based training. For each input text data sample x, the replacement tokens 112 are inserted at their respective locations into the masked text data sample $x^m$ (i.e. the masked version of the input data sample x) to replace the masked tokens, thereby generating an adversarial data sample x'.

As indicated at block 208, the adversarial text data samples x' are provided to the teacher neural network model 104 and the student neural network model 106 to obtain their respective output predictions. In example embodiments, the output predictions of the teacher neural network model 104 and the student neural network model 106 that are obtained are groups of logits that are generated by each of the teacher neural network model 104 and the student neural network model 106 for each of the adversarial text data samples x'.

A generator loss is computed using a generator loss function $L_G=-D_{KL}(T(x')\|S(x'))$ that is designed to minimize a negative Kullback-Leibler (KL) objective, or in other words, to maximize the KL divergence between the teacher and student logits (outputs) on the adversarial text data samples x'. The KL divergence between two discrete distributions P and Q over a probability space is defined as:

$$DL(P\,|\,Q) = \sum\nolimits_{x \in X} P(x) \log\!\left(\frac{P(x)}{Q(x)}\right)$$

As indicated at block 210, the parameters of the text generator 102 (including neural network model 110) are then updated using gradient decent with the objective of maximizing the KL divergence in future training iterations.

The second stage of the method of the present disclosure will now be described with reference to FIG. 1 and the flowchart of FIG. 3, which illustrates a process 300 for KD training of the student neural network model 106 using original training dataset X and the adversarial training dataset X'.

As indicated at block 302, the adversarial text data samples x' are provided to the teacher neural network model 104 and the student neural network model 106 to obtain their respective output predictions, and an adversarial loss $L_{ADV}=D_{KL}(T(x')\|S(x'))$ is computed. The adversarial loss $L_{ADV}$ is the opposite of the generator loss $L_G$ and in this regard is a measure of the KL divergence between the output prediction (i.e. the inferred or predicted output) of the teacher neural network model 104 and the output prediction (i.e. the inferred or predicted output) of the student neural network model 106 on the adversarial text data sample x'. In example embodiments logits (i.e., the output prediction of the final layer of a neural network before the softmax layer of the neural network) generated by the teacher neural network model 104 and the student neural network model 106 are used as the respective predicted outputs for determining the adversarial loss.

As indicated at block 304, the original input text data samples x are provided to the teacher neural network model 104 and the student neural network model 106 to obtain their respective output predictions, and an KD loss $L_{KD}=D_{KL}(T(x)/S(x))$ is computed that is based on the KL divergence between the output predictions of the teacher neural network model 104 and the output predictions of the student neural network model 106 on the input text data samples x. In example embodiments logits (i.e., the output of the final layer of the neural network before the softmax layer of the neural network) generated by the teacher neural network model 104 and the student neural network model 106 are used as the respective output predictions for determining the KD loss.

As indicated at block 306, in the case where true labels y (e.g., labels that are known ground truth labels) are known for at least some of the samples included in the original training dataset x, a Cross Entropy (CE) Loss $L_{CE}(y\|S(x))$ is calculated based on a comparison of the true labels and output predictions from the student network model for the original training samples x. The Cross Entropy loss between the student neural network model output predictions can be defined as:

$$L_{CE} = \sum_{c \in C} \mathbb{1}(y_i = c)\log P(f_i = c)$$

where $\mathbb{1}$ is an indicator function, C is the number of output prediction classes, and P is the probability of the student neural network model and $f_i$ is the ith student output.

In some examples, teacher neural network output predictions may be used as the true labels for determining CE loss.

As indicated at block 308, the adversarial loss $L_{ADV}$, KD loss $L_{KD}$, and CE loss $L_{CE}$ are combined to generate a total loss $L_{total}$. In some examples, the total loss can be an average of the three losses as indicated below, however in other examples the relative weighting of the losses can be adjusted as hyper-parameters:

$$L_{total} = \frac{1}{3} * L_{ADV} + \frac{1}{3} * L_{KD} + \frac{1}{3} * L_{CE} \tag{4}$$

As indicated at block 810, the parameters of the student neural network model 106 are then updated using gradient decent with the objective of minimizing the total loss $L_{total}$.

The stage 1 process 200 and stage 2 process 300 can be iteratively repeated until predefined training criteria are reached.

FIG. 4 illustrates an example of pseudo code 400 that corresponds to the stage 1 process 200 and stage 2 process 300.

Advantageously, the method and system of the present disclosure can in some applications reduce a difference between the accuracy of a teacher neural network model 104 and the accuracy of a student neural network model 106. Further, the method and system of the present disclosure only require access to only the output predictions or logits of the teacher neural network model 104. Moreover, the teacher and student neural network models 104, 106 may have different architectures and the method and system of the present disclosure may be used for training teacher and student neural network models for any particular NLP task.

FIG. 5 illustrates a schematic block diagram of a machine learning system 500 for training a neural network model for an image processing task using adversarial learning and knowledge distillation in accordance with another embodiment of the present disclosure. The image processing based machine learning system 500 is similar to the NPL processing based machine learning system 100 of FIG. 1 with the exception of differences that will be apparent from the following description and FIG. 5. The machine learning system 500 includes an image generator 502, a teacher neural network model 504, and a student neural network model 506.

Teacher neural network 504 is trained to map input image data samples x to respective output predictions ŷ for an image processing task, where the input data sample is an input image. For example, teacher neural network 504 may be configured to assign a classification label to an input image data sample to identify the subject matter of the input image data sample x (e.g., image is of a "cat" or "dog").

Image generator 502 receives, as inputs, image data samples x from an original training dataset X. Each image data sample is an array of pixels, each of which define a respective light intensity value as one or more variables. Whereas the text generator 102 of the NLP based machine learning system 100 of FIG. 1 is configured to perturb data samples by masking and replacing discrete elements or parts of a text data sample that correspond to tokens, the image generator 502 is configured to perturb data samples by masking and replacing discrete elements or parts of an image data sample that correspond to pixels 508. Image generator 502 incudes a mask operation 509 that randomly selects pixels 508 each image data sample x for masking and outputs a masked image data sample x$^m$. In one example, image generator 502 is configured to randomly determine for each pixel 508, based on a defined probability p (for example 30%), if the pixel 508 should be masked or not. Image generator 502 is configured to generate replacement pixels 508' to replace the masked pixels 508 included in masked image data samples x$^m$ and thereby generate respective adversarial image data samples x'. In this regard, the image generator 502 includes a neural network model 506 that is configured to receive a masked image data sample x$^m$ as input and generate replacement pixels 508' for the masked pixels 508. For each input image data sample x, the replacement pixels are inserted at their respective locations into the masked version (i.e., masked image data sample x$^m$) of the input image data sample x to output adversarial image data samples x'.

The adversarial image data samples x' are provided to the teacher neural network model 504 and the student neural network model 506 to obtain their respective output predictions. A loss function $L_G=-D_{KL}(T(x')\|S(x'))$ is computed to minimize a negative KL objective, or in other words, to maximize the KL divergence between the teacher and student output predictions on the adversarial image data samples x'.

The parameters of the image generator 502 (including neural network model 510) are then updated using gradient decent with the objective of maximizing the KL divergence in future training iterations.

The student neural network model 506 is then trained using original training dataset X and the adversarial training dataset X'. The adversarial image data samples x' are provided to the teacher neural network model 504 and the student neural network model 506 to obtain their respective output predictions, and an adversarial loss $L_{ADV}=D_{KL}(T(x')\|S(x'))$ is computed.

The original training image data samples x are provided to the teacher neural network model 504 and the student neural network model 506 to obtain their respective output predictions, and an KD loss $L_{KD}=D_{KL}(T(x)\|S(X))$ is computed that is based on the KL divergence between the predicted output of the teacher neural network model 504 and the predicted output of the student neural network model 506 on the original image data samples x.

In the case where true labels y are known for at least some of the image samples included in the original training dataset x, a Cross Entropy (CE) Loss $L_{CE}(y\|S(x))$ is computed based on a comparison of the true labels and output predictions from the student network model 506 for the original training samples x.

In some examples, the output predictions output by teacher neural network 504 may be used as the true labels for determining CE loss.

The adversarial loss $L_{ADV}$, KD loss $L_{KD}$, and CE loss $L_{CE}$ are combined to generate a total loss $L_{total}$. The parameters of the student neural network model 506 are then updated using gradient decent with the objective of minimizing the total loss $L_{total}$. The image generator training process and student neural network training process can be iteratively repeated until predefined training criteria are reached.

Accordingly, the image generator 502 of the system of FIG. 5 is configured to mask pixels 508 of an image data sample and generate adversarial image data samples by maximizing a divergence between the teacher and student neural network models 504, 506. The student neural network model 506 is then trained using KD using an augmented training dataset comprising both the original images in the training dataset and the adversarial images generated by the image generator 502. The differences between the machine learning system 500 shown in FIG. 5 and the machine learning system 100 shown in FIG. 1 is that pixels of an image are masked rather than tokens and the image generator 502 does not use Gumbel-softmax method for replacement pixel generation. Rather, the image generator 502 may use any non-linear function for pixel generation because pixels are continuous variables and are end-to-end differentiable.

In some examples, sets of neighboring pixels may be grouped and used as discrete parts of the input data samples for masking, rather than just individual pixels.

The methods and systems described above, including each of the teacher neural network model, the student neural network model, the generator, and the processes 200 and 300, can be implemented on one or more computing devices that includes a processing unit (for example a CPU or GPU or special purpose AI processing unit) and persistent storage storing suitable instructions of the methods and systems that can be executed by the processing unit to configure the computing device to perform the functions described above.

Figure 6:
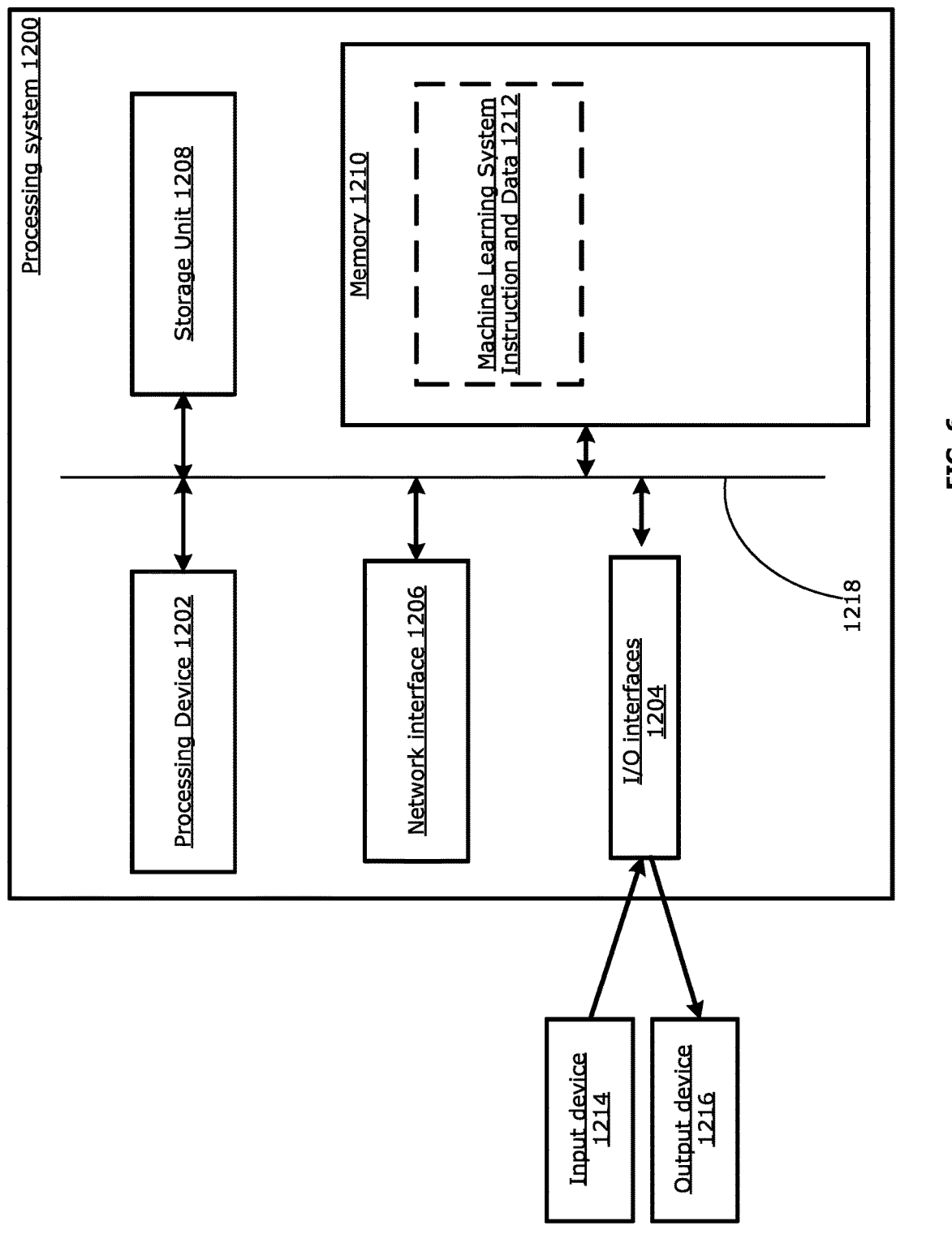
FIG. 6 shows a block diagram of an example simplified processing system which may be used to implement embodiments disclosed herein.

Referring to FIG. 6, a block diagram of an example simplified processing system 1200, which may be used to implement embodiments disclosed herein, and provides a higher level implementation example. One or more of the teacher neural network model 104, 504, the student neural network model 106, 506 and adversarial sample generator 102, 502 as well as other functions included in the machine learning systems 100 and 500 may be implemented on the example processing system 1200, or variations of the processing system 1200. The processing system 1200 could be a terminal, for example, a desktop terminal, a tablet computer, a notebook computer, AR/VR, or an in-vehicle terminal, or may be a server, a cloud end, a smart phone or any suitable processing system. Other processing systems suitable for implementing embodiments described in the present disclosure may be used, which may include components different from those discussed below. Although FIG. 12 shows a single instance of each component, there may be multiple instances of each component in the processing system 1200. The processing system 1200 may include one or more processing devices 1202, such as a graphics processing unit, a processor, a microprocessor, an application-specific integrated circuit (ASIC), a field-programmable gate array (FPGA), a dedicated logic circuitry, accelerator, a tensor processing unit (TPU), a neural processing unit (NPU), or combinations thereof. The processing system 1200 may also include one or more input/output (I/O) interfaces 1204, which may enable interfacing with one or more appropriate input devices 1214 and/or output devices 1216. The processing system 1200 may include one or more network interfaces 1206 for wired or wireless communication with a network.

The processing system 1200 may also include one or more storage units 1208, which may include a mass storage unit such as a solid state drive, a hard disk drive, a magnetic disk drive and/or an optical disk drive. The processing system 1200 may include one or more memories 1210, which may include volatile or non-volatile memory (e.g., a flash memory, a random access memory (RAM), and/or a read-only memory (ROM)). The non-transitory memory of memory 1210 may store instructions for execution by the processing device(s) 1202, such as to carry out examples of the methods and systems described in the present disclosure, for example, CKD/CKD* instructions and data 1212, such as the training datasets, for machine learning system 100 or 500. The memory(ies) 1210 may include other software instructions, such as for implementing an operating system for the processing system 1200 and other applications/functions. In some examples, one or more data sets and/or modules may be provided by an external memory (e.g., an external drive in wired or wireless communication with the processing system 1200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The processing system 1200 may also include a bus 1218 providing communication among components of the processing system 1200, including the processing device(s) 1202, I/O interface(s) 1204, network interface(s) 1206, storage unit(s) 1208 and/or memory(ies) 1210. The bus 1218 may be any suitable bus architecture including, for example, a memory bus, a peripheral bus or a video bus.

The computations of the teacher neural network model 104, 504, student neural network model 106, 506 and adversarial sample generator 102, 502 may be performed by any suitable processing device 1202 of the processing system 1200 or variant thereof. Further, teacher neural network model 104, 504, student neural network model 106, 506 and adversarial sample generator 102, 502 may be use suitable neural network model, including variations such as recurrent neural network models, long short-term memory (LSTM) neural network models.

The present disclosure has been made with reference to the accompanying drawings, in which embodiments of technical solutions are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable storage medium. Lastly, elements referred to in the singular may be plural and vice versa, except where indicated otherwise either explicitly or inherently by context.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media. Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable storage medium.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of training a student neural network model using adversarial learning and knowledge distillation comprising:

training a generator to generate a respective adversarial data sample for each of a plurality of input data samples by replacing selected parts of the input data samples, the training of the generator being based on an objective of maximizing divergence between output predictions generated by the student neural network and a teacher neural network model for the adversarial data samples; and training the student neural network model based on objectives of: (i) minimizing divergence between output predictions generated by the student neural network model and the teacher neural network model for the adversarial data samples generated by the generator, and (ii) minimizing divergence between output predictions generated by the student neural network model and the teacher neural network model for the input data samples.

2. The method of claim 1 wherein training the generator comprises:

for each of the input data samples, randomly selecting and masking the selected parts of the input data sample and generating, using a generator neural network model, the respective adversarial data sample with replacement data for the selected parts of the masked input data;

obtaining output predictions for the respective adversarial data samples from the teacher neural network model and the student neural network model;

computing a generator loss using a generator loss function that is minimized when divergence between the output predictions generated by the student neural network and a teacher neural network model for the respective adversarial data samples is maximized;

updating parameters of the generator neural network model using gradient descent based on the computed loss.

3. The method of claim 2 wherein randomly selecting the selected parts of the input data sample is performed by randomly determining, based on a defined probability, for each part of an input data sample, if the part is to be selected as one of the selected parts.

4. The method of claim 2 wherein generating the replacement data for the selected parts comprises sampling a Gumbel softmax distribution of logits generated by the generator neural network model.

5. The method of claim 4 wherein the student neural network model is trained to perform a natural language processing task and each of the input data samples is a text data sample comprising a set of tokens that each correspond to a discrete text element of the text data sample, wherein the selected parts of the input data samples correspond to individual tokens.

6. The method of claim 1 wherein the student neural network model is trained to perform an image processing task and each of the input data samples is an image data sample comprising a set of pixels, wherein the selected parts of the input data samples correspond to pixels.

7. The method of claim 1 wherein divergence between the output predictions generated by the student neural network and a teacher neural network model for the respective adversarial data samples corresponds to a Kullback-Leibler (KL) divergence.

8. The method of claim 1 wherein the divergence between the output predictions generated by the student neural network and a teacher neural network model for the input data samples corresponds to a Kullback-Leibler (KL) divergence.

9. The method of claim 1 wherein training the student neural network model is also based on an objective of minimizing divergence between output predictions generated by the student neural network for the input data samples and ground truth labels for the input data samples.

10. The method of claim 9 wherein the divergence between the output predictions generated by the student neural network and the ground truth labels for the input data samples corresponds to a Cross-Entropy loss.

11. A system for training a student neural network model using adversarial learning and knowledge distillation, the system comprising one or more processers and a non-transitory storage medium storing software instructions that, when executed by the one or more processors, configure the system to perform a method comprising:

training a generator to generate a respective adversarial data sample for each of a plurality of input data samples by replacing selected parts of the input data samples, the training of the generator being based on an objective of maximizing divergence between output predictions generated by the student neural network and a teacher neural network model for the adversarial data samples; and training the student neural network model based on objectives of: (i) minimizing divergence between output predictions generated by the student neural network model and the teacher neural network model for the adversarial data samples generated by the generator, and (ii) minimizing divergence between output predictions generated by the student neural network model and the teacher neural network model for the input data samples.

12. The system of claim 11 wherein training the generator comprises:

for each of the input data samples, randomly selecting and masking the selected parts of the input data sample and generating, using a generator neural network model, the respective adversarial data sample with replacement data for the selected parts of the masked input data;

obtaining output predictions for the respective adversarial data samples from the teacher neural network model and the student teacher neural network model;

computing a generator loss using a generator loss function that is minimized when divergence between the output predictions generated by the student network and a teacher neural network model for the respective adversarial data samples is maximized;

updating parameters of the generator neural network model using gradient descent based on the computed loss.

13. The system of claim 12 wherein randomly selecting the selected parts of the input data sample is performed by randomly determining, based on a defined probability, for each part of a input data sample, if the part is to be selected as one of the selected parts.

14. The system of claim 12 wherein generating the replacement data for the selected parts comprises sampling a Gumbel softmax distribution of logits generated by the generator neural network model.

15. The system of claim 14 wherein the student neural network model is trained to perform a natural language processing task and each of the input data samples is a text data sample comprising a set of tokens that each correspond to a discrete text element of the text data sample, wherein the selected parts of the input data samples correspond to individual tokens.

16. The system of claim 11 wherein the student neural network model is trained to perform an image processing task and each of the input data samples is an image data sample comprising a set of pixels, wherein the selected parts of the input data samples correspond to pixels.

17. The system of claim 11 wherein divergence between the output predictions generated by the student neural network and a teacher neural network model for the respective adversarial data samples corresponds to a Kullback-Leibler (KL) divergence.

18. The system of claim 11 wherein the divergence between the output predictions generated by the student neural network and a teacher neural network model for the input data samples corresponds to a Kullback-Leibler (KL) divergence.

19. The system of claim 11 wherein training the student neural network model is also based on an objective of minimizing divergence between output predictions generated by the student neural network for the input data samples and ground truth labels for the input data samples; and the divergence between the output predictions generated by the student neural network and the ground truth labels for the input data samples corresponds to a Cross-Entropy loss.

20. A non-transitory computer readable medium storing software instructions that, when executed by the one or more processors, configure the one or more processors to perform a method of training a student neural network model using adversarial learning and knowledge distillation, comprising:

training a generator to generate a respective adversarial data sample for each of a plurality of input data samples by replacing selected parts of the input data samples, the training of the generator being based on an objective of maximizing divergence between output predictions generated by the student neural network and a teacher neural network model for the adversarial data samples; and training the student neural network model based on objectives of: (i) minimizing divergence between output predictions generated by the student neural network model and the teacher neural network model for the adversarial data samples generated by the generator, and (ii) minimizing divergence between output predictions generated by the student neural network model and the teacher neural network model for the input data samples.

\* \* \* \* \*